3,180,878
SEPARATION OF ADIPIC ACID, GLUTARIC ACID AND SUCCINIC ACID FROM MOTHER LIQUORS OBTAINED IN THE MANUFACTURE OF ADIPIC ACID
Charles R. Campbell, John J. Hicks, Jr., and Robert Johnson, Pensacola, Fla., assignors, by mesne assignments, to Monsanto Company, a corporation of Delaware
Filed Mar. 6, 1961, Ser. No. 93,633
4 Claims. (Cl. 260—346.8)

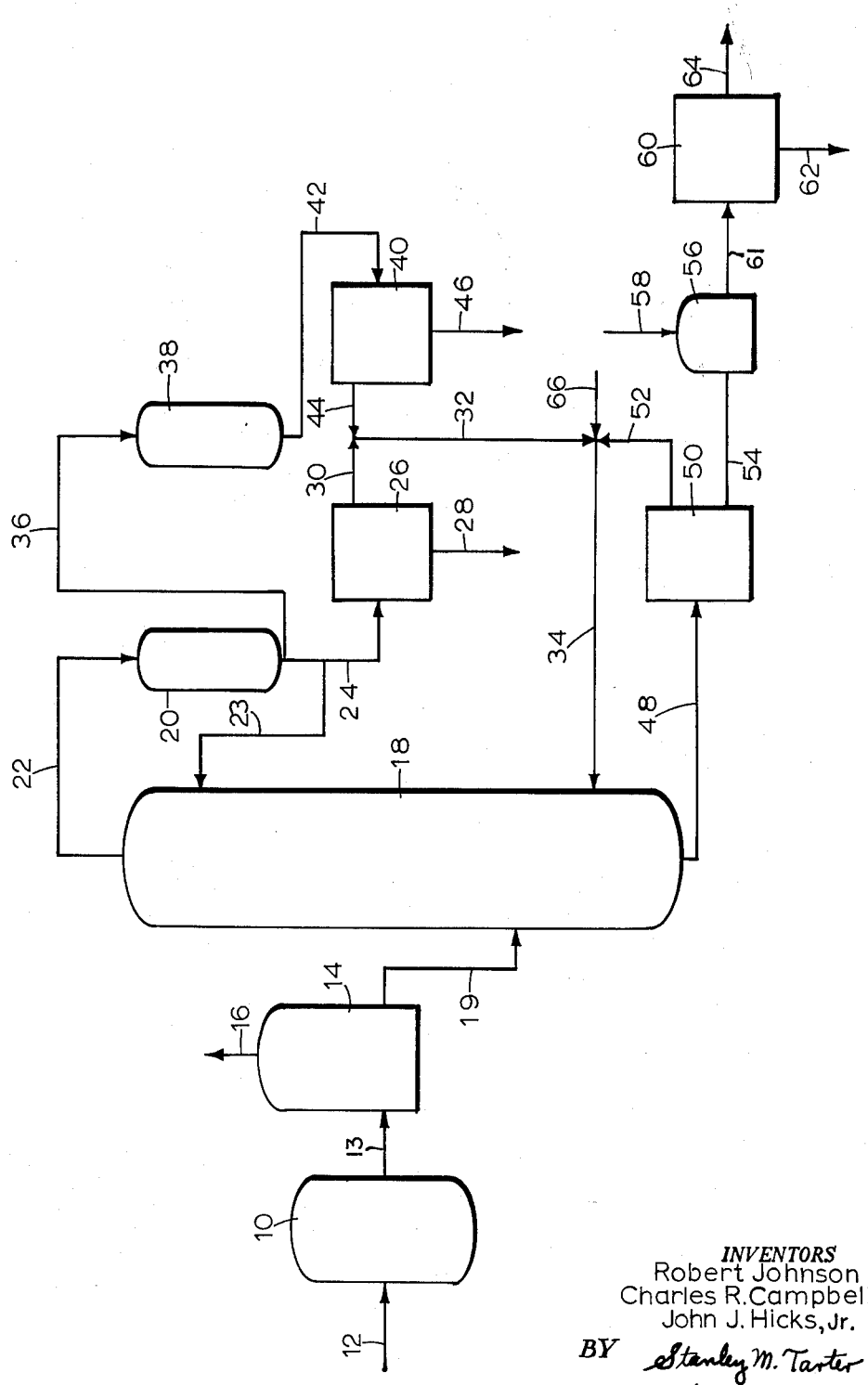

This invention relates to a method for the reclamation of organic dibasic acids from certain chemical process streams. More particularly, the present invention relates to a method of separating adipic acid, glutaric acid, and succinic acid one from the other contained in liquors originated from the mother liquors obtained in the manufacture of adipic acid wherein cyclohexanol and/or cyclohexanone is oxidized and the thus-formed adipic acid is, to the most extent, separated therefrom.

A well-known commercial method of producing adipic acid, a valuable and widely used chemical, involves a series of steps including: (1) the oxidation of cyclohexane in a liquid phase with air or other molecular oxygen-containing gas to a mixture of cyclohexanol and cyclohexanone at rather low conversion but with high yields; (2) the separation of the unoxidized cyclohexane from the mixed cyclohexanol and cyclohexanone intermediate reaction product; (3) the final oxidation of the intermediate product with a strong oxidizing acid, such as nitric acid, into adipic acid and concomitant minor amounts of other dibasic organic acids, including glutaric acid and succinic acid; (4) the isolation of the adipic acid from these by-product organic acids, such as by crystallization. The separation of adipic acid by crystallization from the reaction mixture, as a practical matter, cannot be carried to completion; and some adipic acid, consequently, remains in solution, together with glutaric acid and succinic acid.

This mother liquor, in addition to the aforesaid organic dibasic acids, contains relatively minor amounts of monobasic acids, as well as nitric acid and water. A typical plant stream of a large manufacturing concern, for example, may run as high as several thousand pounds per hour, with the following representative composition:

| | Percent by weight |
|---|---|
| $H_2O$ | 62.0 |
| $HNO_3$ | 9.3 |
| Monobasic acids (as acetic acid) | 0.2 |
| Adipic acid (HOAd) | 5.5 |
| Succinic acid (HOSu) | 8.7 |
| Glutaric acid (HOGl) | 12.0 |
| Catalyst | 2.2 |

Because of the difficulty in and the hitherto economics of further treatment, the mother liquor is commonly disposed of as waste, such as by burning the residual organic matter. Obviously, this represents a substantial loss of valuable chemicals, the most important of which are the by-product dibasic acids.

It is an object of the present invention to provide a process for recovering dibasic acids from a chemical process stream. Another object of the invention is to provide a process to reclaim succinic acid, glutaric acid, and adipic acid from an aqueous mother liquor containing same such as is referred to above. A further object of the present invention is to provide an improved method for the continuous separation and recovery of succinic acid in its anhydride form in high yields from a mixture containing adipic acid, glutaric acid, and succinic acid in proportions such as to preclude individual separation by conventional selective crystallization. Another object of the present invention is to provide an improved method for the continuous separation and recovery of succinic acid and glutaric acid in the forms of their respective anhydrides in high yields from a mixture containing adipic acid, glutaric acid, and succinic acid in proportions such as to preclude separation by conventional selective crystallization. Yet another object of the present invention is to provide a process for converting succinic acid, together with some glutaric acid, contained in an aqueous mother liquor of the aforesaid type into succinic anhydride and glutaric anhydride and recovering the thus-converted anhydrides. These and other objects of the invention will become more readily apparent from the following detailed description and examples.

In the method of this invention, the foregoing objects are realized broadly by first subjecting liquors, such as those obtained in the manufacture of adipic acid by nitric acid oxidation of cyclohexanol and/or cyclohexanone at the point where adipic acid is crystallized and separated from the mother liquor, to controlled conditions inducing the nitric acid and water therein to evaporate therefrom, whereby to leave a residue substantially free of these two substances. The mother liquor can comprise an aqueous nitric acid solution containing succinic acid, glutaric acid, and adipic acid. As indicated above, further crystallization of adipic acid from this solution by conventional methods results in the simultaneous crystallization of succinic acid. However, by treating the mother liquor in accordance with the present process, succinic acid in its anhydride form, together with some glutaric acid in its anhydride form if desired, and adipic acid can be separated and removed in excellent yields from such mother liquor or similar solutions of these mixed dibasic acids. The residue of the evaporation which has been rendered substantially free of nitric acid and water next is admixed with a hydrocarbon having a relatively high boiling point of at least 200° C. and capable of forming a minimum constant boiling heterogeneous mixture with succinic anhydride. The admixture is heated at a sufficiently high temperature and in the presence of such hydrocarbon whereby succinic acid, together with some glutaric acid if desired, is dehydrated to the anhydride form. The resulting azeotrope of the hydrocarbon and anhydride, together with the water of dehydration, is distilled. The succinic anhydride or the mixture of succinic anhydride and glutaric anhydride is separated from the hydrocarbon and water such as by selective condensation and decantation. Adipic acid and the remaining glutaric acid are removed as the bottoms product of the distillation in a suitable manner. For example, the bottoms product is detained to permit same to separate into two layers, the bottom layer of which is withdrawn and dissolved in water. The adipic acid is crystallized from the resulting solution by cooling with the residual glutaric acid remaining in solution.

The aforesaid nitric acid oxidation is normally carried out in the presence of certain oxidation catalysts. One such catalyst found useful for nitric acid oxidation is a mixed catalyst system composed of certain vanadium and copper compounds, for example, ammonium vanadate and cupric nitrate. It has been found advantageous to remove these catalytic materials from the adipic acid mother liquor before the same is processed in accordance with the present invention. The separation of the catalytic material can be carried out by suitable procedures. The removal of the catalysts minimizes certain process problems such as metallic deposition in the apparatus used to effect the reclamation of the organic dibasic acids.

In one catalyst removal procedure the adipic acid mother liquor which contains the vanadium-copper catalyst to be removed is passed continuously through a steam still or like vessel used in distilling liquids at a temperature between 90 and 150° C. and at a pressure of 10 to 400 mm. of Hg, wherein much of the nitric acid and water in the mother liquor is passed overhead. The removal of nitric acid is continued without complete evaporation to dryness taking place until a pH after dilution of at least 1.2 but preferably not greater than 2.2 is obtained. The residue of the evaporation can be diluted with water for ease of material handling. The precipitation of vanadium as an organic-metallic complex is effected by cooling the diluted residue. Thereafter, the vanadium precipitate is isolated from its ambient liquor. The mother liquor from the vanadium separation containing the copper catalyst is intimately contacted with a suitable cation exchange resin, whereby to remove the copper ions therefrom. The resulting liquor containing the organic dibasic acids and thus freed of catalytic material may be processed advantageously in accordance with the present invention.

In a second catalyst removal procedure, the adipic acid mother liquor at a pH of at most 1.8 is brought into reacting contact with a cation exchange resin consisting of the hydrogen form of an oxidation-resistant water-insoluble polymerizate such as a sulfonated polyvinyl aryl compound cross-linked with a suitable amount of a divinyl aryl compound. The intimate contact of the solution with the polymerizate effects the simultaneous removal of the vanadyl ions and the cupric ions. The aqueous solution is separated from the polymerizate and is thus substantially free of catalytic material. As such, it may be processed in accordance with the present invention so as to reclaim the valuable organic material therein.

With reference in greater detail to the preferred practice of the invention, the initial procedure includes the substantial elimination of the nitric acid and water contained in the mother liquor from which the catalytic substances have been removed. The elimination of the nitric acid and water can be effected in one expedient mode of operation by evaporation under suitable pressure and temperature conditions at which these materials will be evaporated from the mother liquor. Preferably, the mother liquor is passed continuously through an evaporator of conventional construction maintained at a temperature sufficiently high to induce evaporation of substantially all the nitric acid and water and to keep the inspissated organic dibasic acid material as a molten residue.

An inert high boiling hydrocarbon is then admixed with the evaporated residue in a suitable manner. It is necessary to use a hydrocarbon stable under the conditions employed and having a boiling point of at least 200° C. and up to 275° C. The lower limit represents the approximate minimum temperature required to convert succinic acid into its distillable anhydride form. The hydrocarbon should form a heterogeneous azeotrope with the succinic anhydride and glutaric anhydride, in order to remove the anhydrides as overhead make as fast as they are formed. At temperatures above the melting points of the anhydrides, the solubility thereof in the hydrocarbon should be relatively low. This minimum solubility is important to obtain good and facile separation of the anhydrides from the hydrocarbon. In addition, the percentage of the anhydrides in the constant-boiling mixture should be relatively high for best results. Additionally, the hydrocarbon should be chemically inert to the mixture of acids and anhydrides under the dehydrating and distilling conditions. Several hydrocarbon candidates meeting the just-mentioned requirements are given below.

The dehydration of the succinic acid, together with some glutaric acid if desired, in the presence of the hydrocarbon may be carried out batch-wise or continuously. In the preferred continuous manner, the evaporated residue in liquid form is flowed at a predetermined rate into a fractionating column in which the aforesaid hydrocarbon is refluxing. The succinic acid in the column dehydrates at a rapid rate so that substantially complete reaction may occur before the other homologous acids are dehydrated to any appreciable extent. However, by varying the conditions during distillation, it is possible to distill overhead a mixture of succinic anhydride and glutaric anhydride. The thus-produced anhydride or mixture of anhydrides forms a heterogeneous azeotrope with the hydrocarbon; and the azeotrope is distilled overhead, together with the water of reaction. In one embodiment of the invention, the distilled anhydride and the hydrocarbon are condensed selectively in a primary condenser maintained above the boiling point of water but below the boiling point of the azeotrope. Some of the azeotrope condensed in the primary condenser may be returned to the column so as to effect better fractionation with the remainder of the condensate being flowed to a decanter of conventional construction wherein the condensate separates into two liquid layers. The anhydride-containing bottom layer is removed by draining periodically or continuously, as desired. The upper layer of hydrocarbon may be returned to the system. The water of reaction and a minor portion of hydrocarbon in the overhead make may be condensed in a secondary condenser with the hydrocarbon being separated from the water so that it may be used again in the system. The anhydride-containing bottom layer may be treated further, if desired. If the bottom layer consists of a mixture of succinic anhydride and glutaric anhydride, these anhydrides can be separated conveniently from each other by conventional fractional distillation because of the significant differences in their boiling points.

Next, the bottoms product of the distillation is passed to a decanter, where two liquid layers are allowed to form at a suitable temperature. The organic dibasic acid-containing bottom layer is removed conveniently by draining. The upper layer of hydrocarbon may be returned to the system. The bottom layer material may be diluted with water and the resulting solution may be cooled to effect crystallization of adipic acid with the glutaric acid remaining in solution.

Bicyclohexyl is an excellent paraffinic hydrocarbon useful for the purpose mentioned above. It has a boiling point of 240° C.; the resulting azeotrope boils at 220° C.; the succinic anhydride content of the azeotrope is approximately 16%; and the solubility of the anhydride in this hydrocarbon is only about 2½% at 145° C. Decahydronaphthalene (decalin) also is quite suitable. In actual practice it has been found that a high boiling petroleum fraction composed mostly of $C_{10}$–$C_{11}$ saturated aliphatic hydrocarbons is of significant utility. One such $C_{10}$–$C_{11}$ hydrocarbon is available commercially under the name "Soltrol 170," sold by Phillips Petroleum Company.

In order to obtain a more complete understanding of the present invention, reference is now made to the accompanying drawing which is a block flow diagram illustrating a continuous process system. Adipic acid mother liquor is supplied to a catalyst removal zone 10 through a conduit 12. The material supplied to the said zone may be the aqueous liquor obtained during the manufacture of adipic acid by the nitric acid oxidation of cyclohexanol and cyclohexanone in the presence of an oxidation catalyst. From the catalyst removal zone the aqueous mother liquor freed of catalyst is withdrawn and passed via conduit 13 into an evaporating means 14 of a conventional type adapted to remove nitric acid and water from the mother liquor. The residue remaining after evaporation is a free-flowing liquid above 110° C. and exhibits melting points from 60° C. to about 100° C., depending, in the main, on the relative content of the dibasic acids therein. The nitric acid and water are removed overhead through line 16.

The evaporation residue is maintained in a liquid stage and is fed to the lower portion of a continuous distillation column 18. Line 19 interconnects this column and evaporator 14. Refluxing at a base temperature, preferably within the range of 180–275° C. is a high boiling hydrocarbon as defined above. The feed rate and withdrawal rate of the bottoms product may be controlled so that succinic acid is dehydrated before any appreciable amount of glutaric acid is dehydrated. However, these rates may be controlled so that both succinic acid and some glutaric acid are dehydrated simultaneously. The optimum boil-up to feed ratio and the reflux ratio depend, among other things, upon the design of the column, but may be controlled to remove as much succinic anhydride as practicable with a minimum carry-over of glutaric anhydride. On the other hand, these conditions may be controlled so that both glutaric anhydride and succinic anhydride are present in the anhydride make.

As indicated above, succinic anhydride or a mixture of succinic anhydride and glutaric anhydride forms under these conditions and is removed from column 18 as a heterogeneous azeotrope with the hydrocarbon and the water of reaction. The azeotrope may contain from 5 to 20% or more anhydride and is condensed in a primary condenser 20 operated at a preferred temperature of 120–140° C. Line 22 interconnects the top of column 18 with condenser 20. Part of the condensate is returned to the column as reflux through line 23 to provide more efficient fractionation. The remainder of the condensate flows through line 24 into a first decanter 26 maintained at a temperature similar to condenser 20. The anhydride product constitutes the lower layer of the two-component system in the decanter with the hydrocarbon being in the upper layer. The anhydride product is withdrawn through pipe 28 for further treatment, if desired. The upper layer which contains a minimum amount of anhydride dissolved in the hydrocarbon is withdrawn continuously and returned to the base of column 18 via lines 30, 32 and 34. The vaporous material containing mostly water and some hydrocarbon and leaving the primary condenser 20 is flowed through line 36 and is condensed in a secondary condenser 38 operated at a suitable temperature. This second condensate is collected in a second decanter 40. Line 42 interconnects condenser 38 and decanter 40. The upper hydrocarbon-containing layer formed in decanter 40 is continuously returned to the column 18 via lines 44, 32 and 34. The lower water layer is removed from the system through pipe 46.

The bottoms product withdrawn from the base of the column 18 is flowed at a predetermined rate through line 48 to a third decanter 50. The hydrocarbon-containing upper layer is continuously returned to the column by means of lines 52 and 34. The lower-layer which contains the residual adipic acid and glutaric acid is withdrawn from the decanter 50 and is flowed through line 54 to a line mixer 56 wherein the residue is dissolved in water supplied by means of line 58. The resulting solution is cooled in a chiller 60 to crystallize adipic acid selectively from the solution, the solution being flowed through line 61 between the mixer 56 and chiller 60. The adipic acid precipitate is filtered and removed via conduit 62. The aqueous solution containing glutaric acid is withdrawn from the system via line 64. Makeup hydrocarbon can be added to the system as needed through line 66.

In order to illustrate better the invention, the following examples are given which exemplify the invention but should not be construed to limit the same. The parts and percentages employed therein are by weight unless otherwise indicated.

EXAMPLE I

In a continuous manner about 5300 parts per hour of feed material is processed in an apparatus substantially as described above. The feed material contains about 6.2% adipic acid, 13.4% glutaric acid, 9.9% succinic acid, 68.6% water and 1.8% nitric acid and is flowed into an evaporator operated at a temperature of 140° C. and at a pressure of 140 mm. of Hg. Substantially all the water and nitric acid is removed from the feed material at this point. The evaporated residue is continuously fed in a molten condition through a heated line to a continuous distillation unit. The unit comprises a reboiler, a column, primary and secondary condensers, and a fresh hydrocarbon feed line. The evaporated residue is fed into the column near the bottom thereof. In the unit 5128 parts per hour of "Soltrol 170" hydrocarbon is refluxed. The base temperature of the column is 250° C. Succinic anhydride which forms an azeotrope with the hydrocarbon is distilled over at a rate of 744 parts per hour. Glutaric anhydride forms an azeotrope with the hydrocarbon and is distilled overhead at a rate of 67 parts per hour. Also in the boil-up is the water of dehydration. The tails of the column is withdrawn therefrom at a rate of 3153 parts per hour and is led to the decanter. The lower layer of the two layers formed in the decanter is withdrawn and mixed with water supplied at a rate of 256 parts per hour. The resulting solution is cooled to 40° C. to crystallize the adipic acid. The adipic acid is filtered from the resulting magma, and the rate of recovery of adipic acid is 246 parts per hour. In the mother liquor the main constituent is glutaric acid.

EXAMPLE II

Several continuous runs were made using the apparatus substantially as described above. Different high boiling hydrocarbons identified in Table 1 below were refluxed in the apparatus under conditions indicated in the same table. The apparatus comprised a reboiler, a column, a primary condenser, and a decanter for separation and recovery of anhydride make, and a secondary condenser.

*Table 1*

| Run No | 1 | 2 | 3 | 4 | 5 |
|---|---|---|---|---|---|
| Solvent | Decalin | Bicyclohexyl | Soltrol 170 | | |
| Reflux Ratio | 1:1 | 1:1 | 1:2 | 1:2 | 1:2 |
| Feed Rate, parts/hr | 360–540 | 200–700 | 500–900 | 500 | 250 |
| Base Temp | 208 | 250 | 250 | 260 | 250 |
| Feed Composition: | | | | | |
| Adipic Acid, percent | 20.3 | 20.3 | 22.6 | 23.6 | 31.0 |
| Glutaric Acid, percent | 41.9 | 41.9 | 43.2 | 42.3 | 61.1 |
| Succinic Acid, percent | 34.6 | 34.6 | 30.6 | 31.3 | 2.7 |
| Anhydride Make Comp.: | | | | | |
| Adipic Acid, percent | 0 | 1.2 | 1.8 | 0.8 | 5.2 |
| Glutaric Anhydride, percent | 3.9 | 17.7 | 4.8 | 0.9 | 71.4 |
| Succinic Anhydride, percent | 94.9 | 62.3 | 86.6 | 93.0 | 8.0 |
| Percent Anhydride in Azeotrope | 5.3 | 16.2 | 11.7 | 14.2 | 6.2 |
| Percent Anhydride in Hydrocarbon Return | | 2.0 | 1.9 | 1.8 | 1.9 |
| Tails Composition: | | | | | |
| Adipic Acid, percent | 27.8 | 36.2 | 25.6 | 27.6 | 34.8 |
| Glutaric Acid, percent | 55.5 | 53.3 | 50.6 | 53.7 | 54.6 |
| Succinic Acid, percent | 6.7 | 0.9 | 21.1 | 13.1 | 0.3 |

From the practice of the invention as above-described numerous advantages have been found to result. The valuable organic material that would normally be lost from the system is recovered advantageously by the disclosed process. Furthermore, a waste disposal problem of the recovered substances is obviated.

Various modifications of the invention will be apparent to those skilled in the art. Hence, it will be understood that the invention is not limited to the foregoing description or annexed drawing except as it is defined in the appended claims.

What is claimed is:

1. A process for treating a substantially dry and nitric acid free mixture of succinic acid, glutaric acid, and adipic acid which comprises the steps of admixing with said mixture an inert paraffinic hydrocarbon having a boiling point of 200–275° C. and capable of forming a minimum constant boiling heterogeneous mixture with succinic anhydride, heating the resulting admixture at a base temperature of 180–175° C. to dehydrate the succinic acid to succinic anhydride, distilling the resulting heterogeneous azeotrope of said hydrocarbon and succinic anhydride together with the water of dehydration, and recovering the succinic anhydride from the make of the distillation.

2. A continuous process for treating a substantially dry and nitric acid free mixture of succinic acid, glutaric acid, and adipic acid which comprises continuously feeding said mixture in a molten state into the dehydration zone of a continuous fractionating system, said zone containing a refluxing inert hydrocarbon having a boiling point of at least 200° C. and capable of forming a minimum constant boiling heterogeneous mixture with succinic anhydride and maintained at a temperature sufficiently high to dehydrate the succinic acid to succinic anhydride, said hydrocarbon being selected from the group consisting of a saturated aliphatic $C_{10}$–$C_{11}$ petroleum fraction, bicyclohexyl, and decahydronaphthalene, continuously distilling from the system the resulting heterogeneous azeotrope of said hydrocarbon and succinic anhydride together with the water of dehydration, continuously condensing the azeotrope, continuously detaining the condensed azeotrope at a temperature sufficient to maintain the succinic anhydride as a liquid thereby to permit the said condensed azeotrope to separate into two layers, continuously withdrawing the top layer containing the hydrocarbon and returning same to the system, and continuously collecting the lower layer as recovered succinic anhydride.

3. A continuous process for treating a substantially dry and nitric acid free mixture of succinic acid, glutaric acid, and adipic acid which comprises continuously feeding said mixture in a molten state into the dehydration zone of a continuous fractionating system, said zone containing a refluxing hydrocarbon having a boiling point of 200–275° C. and capable of forming a minimum constant boiling heterogeneous mixture with succinic anhydride and being chemically inert to succinic anhydride and to the said mixture under the conditions in said zone, said hydrocarbon being selected from the group consisting of a saturated aliphatic $C_{10}$–$C_{11}$ petroleum fraction, bicyclohexyl, and decahydronaphthalene, the base temperature in said zone being 180–275° C. whereby to dehydrate the succinic acid to succinic anhydride, continuously distilling from the system the resulting heterogeneous azeotrope of said hydrocarbon and succinic anhydride together with the water of dehydration, continuously condensing the overhead product selectively to condense the said azeotrope in a first condensation zone and to condense the water of dehydration in a second condensation zone, continuously detaining the condensate of the first condensation zone at a temperature sufficient to maintain the succinic anhydride as a liquid thereby to permit the said condensate to separate into two layers, continuously withdrawing the top layer containing the hydrocarbon in which a minimum amount of succinic anhydride is dissolved, continuously returning the withdrawn top layer to the system, continuously collecting the lower layer as recovered succinic anhydride, continuously withdrawing the bottoms product of the dehydration zone, continuously detaining the said bottoms product at a temperature sufficient to maintain the same as a liquid thereby to permit the said bottoms product to separate into two layers, continuously withdrawing the top layer of the detained bottoms product and returning same to the system, continuously withdrawing the bottom layer of the detained bottoms product and dissolving same in water, cooling the resulting aqueous solution to form adipic acid precipitate, and separating the adipic acid so-precipitated therefrom.

4. A continuous process for treating a substantially dry and nitric acid free mixture of succinic acid, glutaric acid, and adipic acid which comprises continuously feeding said mixture in a molten state into the dehydration zone of a continuous fractionating system, said zone containing a refluxing saturated aliphatic $C_{10}$–$C_{11}$ petroleum hydrocarbon fraction maintained at a temperature sufficiently high to dehydrate the succinic acid to succinic anhydride, continuously distilling from the system the resulting heterogeneous azeotrope of said hydrocarbon and succinic anhydride together with the water of dehydration, continuously condensing the azeotrope, continuously detaining the condensed azeotrope at a temperature sufficient to maintain the succinic anhydride as a liquid thereby to permit the said condensed azeotrope to separate into two layers, continuously withdrawing the top layer containing the hydrocarbon and returning said to the system, and continuously collecting the lower layer as recovered succinic anhydride.

References Cited by the Examiner
UNITED STATES PATENTS

| 2,971,010 | 2/61 | Gilby et al. | 260—537 |
| 3,036,127 | 5/62 | Chafetz | 260—346.8 |

FOREIGN PATENTS

| 833,230 | 4/60 | Great Britain. |

LORRAINE A. WEINBERGER, *Acting Primary Examiner.*

LEON ZITVER, *Examiner.*

UNITED STATES PATENT OFFICE
CERTIFICATE OF CORRECTION

Patent No. 3,180,878                                   April 27, 1965

Charles R. Campbell et al.

It is hereby certified that error appears in the above numbered patent requiring correction and that the said Letters Patent should read as corrected below.

Column 7, line 3, for "180-175° C." read -- 180-275° C. --.

Signed and sealed this 28th day of September 1965.

(SEAL)
Attest:

ERNEST W. SWIDER                                 EDWARD J. BRENNER
Attesting Officer                                    Commissioner of Patents